Patented Aug. 24, 1954

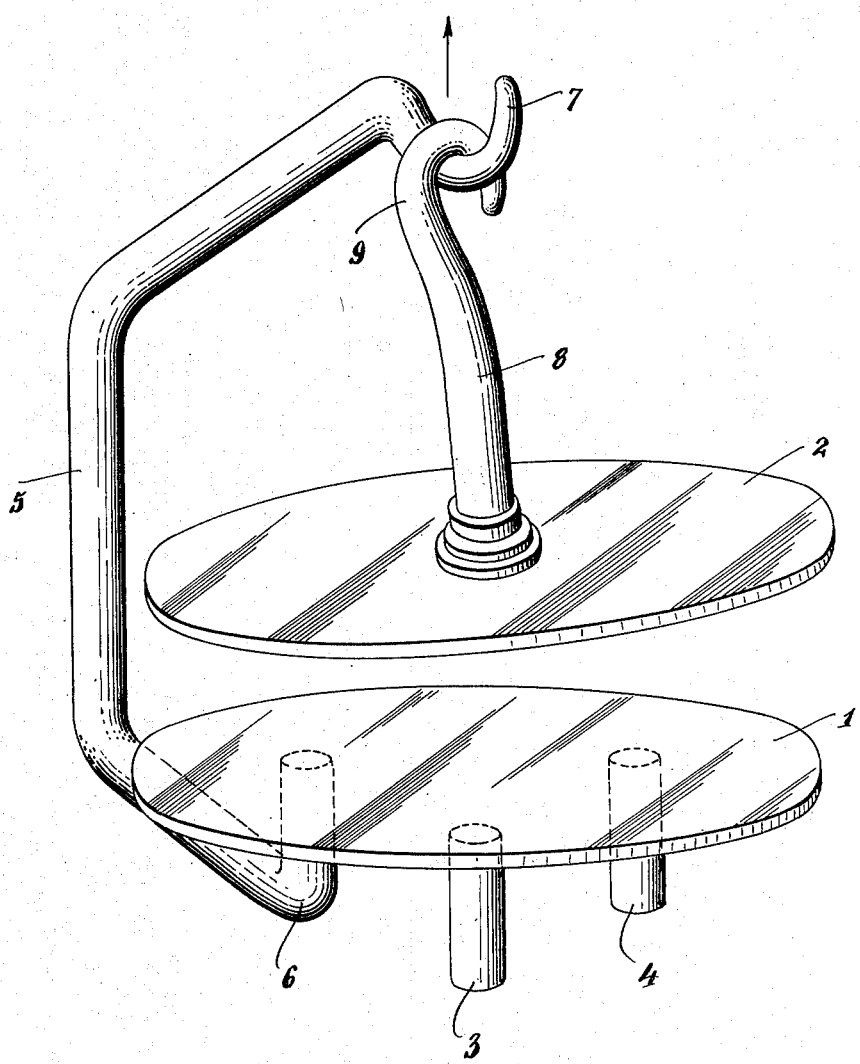

2,687,039

UNITED STATES PATENT OFFICE 2,687,039

MOISTURE CONTENT DETERMINATION AND APPARATUS FOR MAKING THE DETERMINATION

Wilhelm Heidbrink, Memmingerberg, Germany

Application January 31, 1951, Serial No. 208,701

Claims priority, application Germany January 31, 1950

5 Claims. (Cl. 73—53)

The present invention relates to a weighing appliance for the determination of volatile substances such as water in highly viscous solutions and emulsions.

The determination of e. g. water by the determination of the loss of weight in the drier often meets with special difficulties in the case of highly viscous solutions and emulsions.

During the drying process viscous solutions form a skin or firm crust on the surface which prevents the escape of the residue of water. In the case of emulsions of both types, water/oil as well as oil/water, both phases separate during the heating process. The oil then swims on the surface, by which fact also a complete drying is prevented. Also the determination of other volatile solvents and emulsion phases than water can prove to be the cause of special difficulties should a certain degree of viscosity be exceeded. In such cases the determination of water is generally carried out according to three different methods:

1. The sample is being heated far beyond the boiling point of water. Thereby, the increased vapour pressure overcomes the mentioned difficulty, but there simultaneously exists the danger of a chemical change through overheating of the other components of the sample.

Example.—Determination of water in butter.

2. The sample is being mixed with prepared, weight-constant sand. Thus the surface of the substance to be tested is being enlarged and the formation of steam-hindering layers avoided. This method allows the use of lower temperatures and is very exact, but wearisome on account of the minute preparations.

Example.—Determination of water in butter.

3. Destillation of the sample with a solvent being unmixable with water and having a higher boiling point than water.

According to this method a mixture of steam and the vapour of the solvent distills over which, according to the Avogadro rule, contains both components in molecular proportions. In the condensate the water then separates from the solvent and is determined volumetrically.

This method also has some deficiencies: The waterdrops often obstinately adhere to the rim of the separating vessel. To obtain exact values large quantities must be used and weighed.

Example.—Determination of water in tar and bitumen by means of toluene or xylene.

In order to meet the afore-mentioned tasks, according to the invention, a weighing appliance has been developed which makes the quick determination of water or other volatile substances in highly viscous mixtures, solutions or emulsions possible with small quantities to be weighed by determining the loss of weight during the drying process.

The new appliance consists of two glass plates of equal dimensions both being on one side each plane-parallel ground and preferably frosted. Instead of glass, other materials may be used and it is not necessary that they be transparent although this is the preferred form of embodiment. It is necessary that these materials are resistant to chemicals, such as fats, oils, organic solvents, acids, and alkali. By way of example there may be mentioned artificial products and china. Examples of artificial products are plastics and amino-plastics.

Preferably the two plates are combined by suitable means in such a way that it is possible to suspend one plate on a part of the other plate, e. g. by a bar fastened to the lower non-ground side of one plate and being curved and provided with a suitable suspension device at its end in such a way that the other plate by suitable means, e. g. by means of a ring or a hook at its upper non-ground side may be suspended at the end of the bar approximately opposite to the first mentioned plate; of course the lowest and curved part of the mentioned bar must be flattened in order to form a base of stand for the appliance. Another form of embodiment is the following: A cage of e. g. cubic form and one wall left out is provided. One glass plate is put on or even connected to the bottom wall of the cube, the other is suspended by means of a hook or ring on its upper, non-ground side on the top wall by means of a ring or hook connected thereto. Generally speaking means are provided allowing suspending one plate above the other in such a way that the plane-parallel surfaces face each other.

The accompanying drawing shows one preferred form of embodiment of the weighing appliance according to the present invention.

The little weighing glass essentially consists of two equal-sized, circular, plane-parallel glass plates 1, 2 of, say approximately 60 mm. diameter, frosted on one side each.

On the smooth side of the one plate, two little glass posts 3, 4 of 4-5 mm. height are fused on and, furthermore, a little gallows 5 consisting of a glass tube or bar, the lower part 6 of which also serves as little post and the upper part of which terminates vertically above the center of the frosted side of the glass plate 1 in a small hook 7.

Vertically fused on to the center of the smooth side of the other plate 2 is a short glass tube or rod 8, e. g. 25-30 mm. long, terminating also in a little hook 9.

The appliance is adjusted in such a maner that the second little plate by means of its small hook can be hooked on to the gallows, so that it hangs at a distance of 10-15 mm. above the first plate, both frosted sides facing each other.

The application of the weighing glass takes place as follows:

1. The appliance, assembled by hooking-in the upper plate 2, is prepared by heating it in the drier up to the temperature provided for the test and by re-cooling it in the exsiccator down to room temperature and then taring it out on the analytical balance.

2. A small average sample of 100-150 milligrams, depending on the viscosity of the material to be analysed is applied in the shape of a large drop or a blot to the center of the lower plate 1. The upper plate 2 is immediately placed on top of the sample to which it sticks by adhesion. The appliance thus loaded by the sample is then weighed, the exact weight of the sample being determined by subtracting the tare.

It has been proved in practice that such a seemingly incomplete sealing of the sample material suffices to prevent a premature loss of weight through evaporation; steam and also the vapour of other solvent will, on account of their affinity to the glass, not escape from the small space between the two frosted sides of the glass plates.

3. After the determination of the weight of the sample, the appliance is held with one hand of the operator by the gallows, whereas the upper plate 2 is gripped with the other hand using the short glass rod 8. Through slight pressure and pushing to and fro, the sample is then distributed absolutely evenly between the two frosted sides. Finally, the upper plate 2 is separated from the lower plate 1 by sidewise pushing and then hooked on to the gallows. The sample has now been spread on both frosted sides in two extremely thin films and distributed on a large surface. The drying process can thus be achieved in the warmth of a drier within a very few minutes.

4. After the evaporation of the water or the solvent to be determined, the weighing appliance is placed into the exsiccator to cool down to room temperature.

When taking the appliance out of the exsiccator, the upper plate 2 is immediately hooked off the gallows and placed on to the lower plate 1.

The frequently very hygroscopic dry residue of the sample is thereby sufficiently protected against any reabsorption of water from the air, so that the exact determination of the weight can take place at leisure during the following weighing.

Instead of water e. g. also petrol, benzene, acetone, may be determined, generally speaking all organic solvents of a higher vapour pressure than their accompanying liquids. The invention is of course especially useful if on the highly viscous system or on the emulsion an impermeable thin skin is formed on the surface thus preventing the escape of the volatile constituent from the mixture; the invention is also of special value in case of substances where a long heating above the boiling point may result in destruction, oxidation or in another chemical change. It is also possible to determine increases in weight which take place by the oxidation of drying oils or the like.

Emulsions suitable to be tested by the appliance according to the invention, where a fatty layer prevents the escape of the water, are butter, margarine, emulsions for cooking purposes, ointments, a. s. o., bituminous emulsions. Examples of systems especially sensible against heating are samples of blood and serum.

Having now particularly described the nature of my invention, what I claim is:

1. Method for the determination of volatile substances in highly viscous systems comprising putting the sample to be analysed between the plane-parallel surfaces of two glass plates of equal size, weighing the appliance, distributing the sample on these surfaces by moving these plates contacting each other to and fro, lifting the glass plates off each other, putting them in a drier, heating them for a suitable length of time to a suitable temperature therein and weighing them again.

2. Method for the determination of volatile substances in highly viscous systems, which consists in heating flat plates, weighing the flat plates following heating to determine their tare, placing the samples to be analysed between the adjacent faces of the plates, weighing the plates and samples, contacting the plates with the sample therebetween to distribute the sample thereon, lifting the glass plates off each other, heating the plates for a suitable length of time to a suitable temperature, and weighing the plates again.

3. Weighing apparatus, comprising a first flat plate, a bar extended from said flat plate at one side thereof and vertically upward at right angles to the plane of said plate, a hook on the top end of said bar extended radially inward over the center of said first plate, a second flat plate above said first plate, a rod extended upward from the face of said second plate facing away from said first plate, and a second hook on the top end of said rod engaged with said first hook supporting said second plate over said first plate.

4. A weighing apparatus according to claim 3, wherein said rod is of a length less than the space between said first hook and the adjacent face of said first plate, so that when said hooks are engaged said second plate will be suspended above said first plate.

5. A weighing apparatus according to claim 4, wherein said plates are glass discs of equal diameter and have their adjacent faces frosted.

References Cited in the file of this patent

UNITED STATES PATENTS

| Number | Name | Date |
|---|---|---|
| 1,437,730 | Eberly | Dec. 5, 1922 |
| 1,441,564 | Eberly | Jan. 9, 1923 |

FOREIGN PATENTS

| Number | Country | Date |
|---|---|---|
| 22,137 | Great Britain | A. D. 1907 |

OTHER REFERENCES

Serial No. 226,453, Brandt (A. P. C.), published May 4, 1943.